(12) United States Patent
Fardi et al.

(10) Patent No.: US 6,983,086 B2
(45) Date of Patent: Jan. 3, 2006

(54) THERMALLY ISOLATING OPTICAL DEVICES

(75) Inventors: Behzad Fardi, San Jose, CA (US); Farshid Adibi, San Jose, CA (US); Chaoyang Li, San Jose, CA (US); Anirban Bandyopadhyay, San Jose, CA (US); Mahesh Junnarkar, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/465,210

(22) Filed: Jun. 19, 2003

(65) Prior Publication Data

US 2004/0258344 A1   Dec. 23, 2004

(51) Int. Cl.
*G02B 6/12* (2006.01)

(52) U.S. Cl. .............................. 385/14; 438/31; 257/98
(58) Field of Classification Search ................... 385/14
See application file for complete search history.

(56) References Cited

U.S. PATENT DOCUMENTS

| 4,966,037 A | * | 10/1990 | Sumner et al. .......... 73/204.26 |
| 5,013,680 A | * | 5/1991 | Lowrey et al. ............. 438/242 |
| 6,075,269 A | * | 6/2000 | Terasawa et al. ........... 257/330 |
| 6,847,750 B1 | | 1/2005 | Baumann et al. |
| 2003/0176002 A1 | * | 9/2003 | Zhang et al. ................. 438/22 |

FOREIGN PATENT DOCUMENTS

WO    WO 01/42848    6/2001

* cited by examiner

*Primary Examiner*—John R. Lee
*Assistant Examiner*—Phillip A. Johnston
(74) *Attorney, Agent, or Firm*—Trop, Pruner & Hu, P.C.

(57) ABSTRACT

A thermo-optic device may be formed with trenches that undercut the substrate beneath the thermo-optic device. Through the removal of the underlying substrate, the heat dissipation of the thermo-optic device may be reduced. This may reduce the thermal budget of the device, reducing the power requirements for operating the device in some embodiments.

3 Claims, 2 Drawing Sheets

THERMALLY ISOLATING OPTICAL DEVICES

BACKGROUND

This invention relates generally to optical components including those used in optical communication networks.

In optical communication networks, a waveguide core may extend across a semiconductor substrate. The core may be covered by an upper cladding and may be positioned over a lower cladding. The core may define an optical signal path. The cladding may have a lower refractive index than the core.

In some cases the optical characteristics of the core may be thermally modified. For example, thermo-optic devices may be operated through the application of heat. The refractive index of an optical device may be changed by heating. Thermo-optic switches may be used in Mach-Zehnder interferometers and directional couplers, as two examples.

Generally, the more heat that is dissipated by the thermo-optic device, the more the power requirements of the overall component. It is desirable to reduce the heat transfer to only that needed to achieve the thermo-optic effect.

Thus, there is a need for ways to reduce the amount of heat loss in thermo-optic devices.

DETAILED DESCRIPTION

Figure 1:
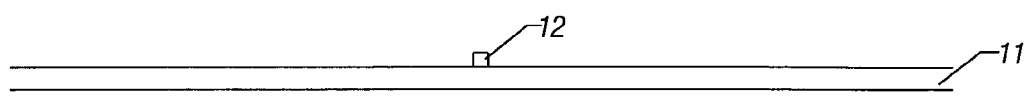
FIG. 1 is an enlarged cross-sectional view of one embodiment of the present invention at an early stage of manufacture.
Figure 2:
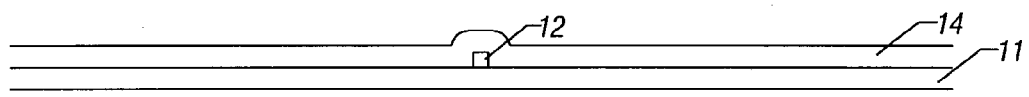
FIG. 2 is an enlarged cross-sectional view of one embodiment of the present invention at a subsequent stage of manufacture.

Referring to FIG. 1, a waveguide core 12 may be defined on a lower cladding 11 over a semiconductor substrate 10. In one embodiment, the core 12 may be part of a planar lightwave circuit. The core 12 and lower cladding 11 may, in turn, be covered by an upper cladding 14 as shown in FIG. 2.

Figure 3:
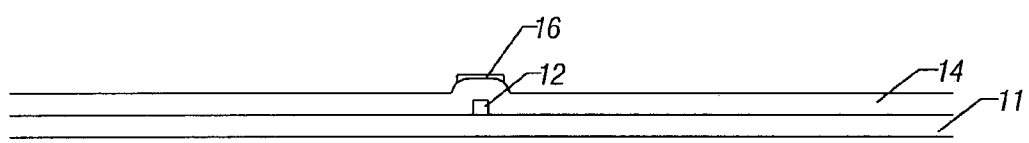
FIG. 3 is an enlarged cross-sectional view of one embodiment of the present invention at a subsequent stage of manufacture.

Referring to FIG. 3, an electric resistance heater 16 may be defined over the upper cladding 14 atop the core 12. The heater 16 may be a more resistive material coupled to a source of power by a less resistive material. The electrical resistance heater 16 is selectively operable to change the optical properties of the core 12 in the vicinity of the heater 16. For example, in one embodiment, a thermo-optic switch may be formed.

Figure 4:
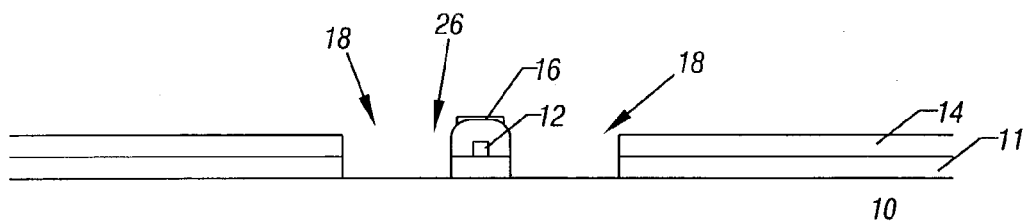
FIG. 4 is an enlarged cross-sectional view of one embodiment of the present invention at a subsequent stage of manufacture.

Referring to FIG. 4, a pair of trenches 18 may be formed on either side of the heater 16 and core 12. The trenches 18 may be spaced from the core 12 to leave protective upper cladding 14 around the core 12, in one embodiment. The trenches 18 may extend through the upper cladding 14 and the lower cladding 11 down to the semiconductor substrate 10 in one embodiment of the present invention. A thermo-optic device 26 is defined between the trenches 18, in one embodiment.

Figure 5:
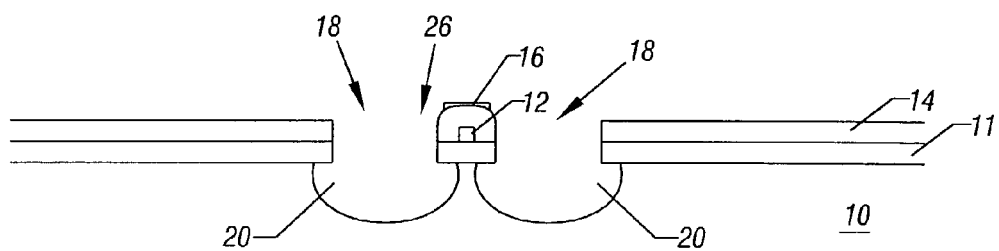
FIG. 5 is an enlarged cross-sectional view of one embodiment of the present invention at a subsequent stage of manufacture.

Using the thermo-optic device 26 as a mask, an isotropic etch may be implemented into the substrate 10 through the trenches 18 to form the undercut regions 20, in one embodiment of the present invention, shown in FIG. 5. The etchant is more selective of the substrate 10 material and is less selective of the cladding material 11 and 14. Because of the isotropic nature of the etching, the etching extends under the lower cladding 11 on opposed sides of each trench 18. By the term isotropic, it is intended to refer to an etchant that etches outwardly under a mask that defines an opening for the etchant to etch an underlying material.

The resulting regions 20 extend under the structure that includes the core 12 and the heater 16. One result of this under-etching is to reduce the amount of substrate 10 material underneath the core 12 and the heater 16.

Figure 6:
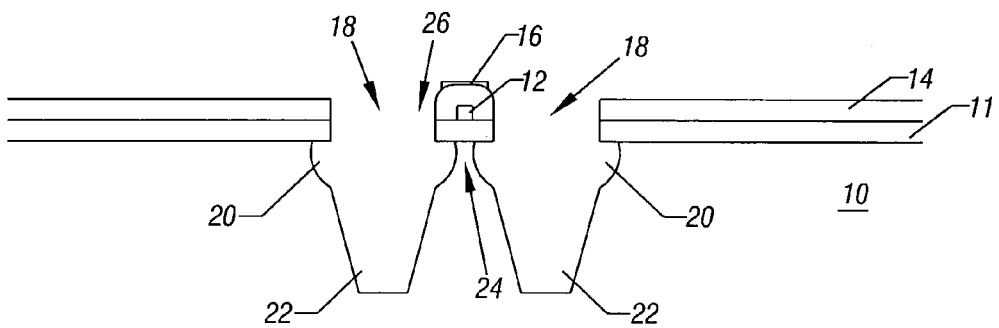
FIG. 6 is an enlarged cross-sectional view of one embodiment of the present invention at a subsequent stage of manufacture.

Referring to FIG. 6, the trenches 18 may guide the anisotropic etching from the bottoms of the regions 20. The etchant is more selective of the substrate 10 than of the cladding 11 or 14. As a result, an anisotropically etched trench 22 extends below the regions 20 formed by isotropic etching. A substantial portion of the substrate 10 material underneath the core 12 and the heater 16 is removed, leaving a relatively thin pillar 24 of substrate 10.

The inventors of the present invention have determined that a substantial portion of the heat loss from heater 16 occurs through the semiconductor substrate 10. By reducing the amount of available substrate 10 underneath the heater 16, this heat loss may be reduced. The heat loss may increase the power needs of the device and dispersed heat may adversely affect the optical properties of surrounding components.

In some embodiments, the regions 20 and the trenches 22 may be filled with a thermally isolating material. Also, in some embodiments, the trenches 18 may also be filled or covered with a thermally isolating material.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An optical circuit comprising:
a thermo-optic device including a waveguide core formed over a semiconductor substrate, said core covered by a cladding; and an opening in said semiconductor substrate extending under said thermo-optic device, said opening having a first laterally extending region communicating with a second deeper, vertically extending region, said vertically extending region having a lateral extent less than the lateral extent of said laterally extending region, wherein said first laterally extending region is isotropically etched, and said second vertically extending region is anisotropically etched.

2. The circuit of claim 1 including a pair of openings extending under said thermo-optic device device.

3. The circuit of claim 1 wherein said thermo-optic device includes a heater formed over said cladding.

* * * * *

UNITED STATES PATENT AND TRADEMARK OFFICE
CERTIFICATE OF CORRECTION

PATENT NO. : 6,983,086 B2
DATED : January 3, 2006
INVENTOR(S) : Behzad Fardi et al.

It is certified that error appears in the above-identified patent and that said Letters Patent is hereby corrected as shown below:

<u>Column 2,</u>
Line 62, "device device" should be -- device --.

Signed and Sealed this

Twenty-eighth Day of March, 2006

JON W. DUDAS
*Director of the United States Patent and Trademark Office*